May 7, 1935.   J. H. MORROW   2,000,293
SEAL FOR CONVEYING APPARATUS
Filed Aug. 15, 1933   2 Sheets-Sheet 2

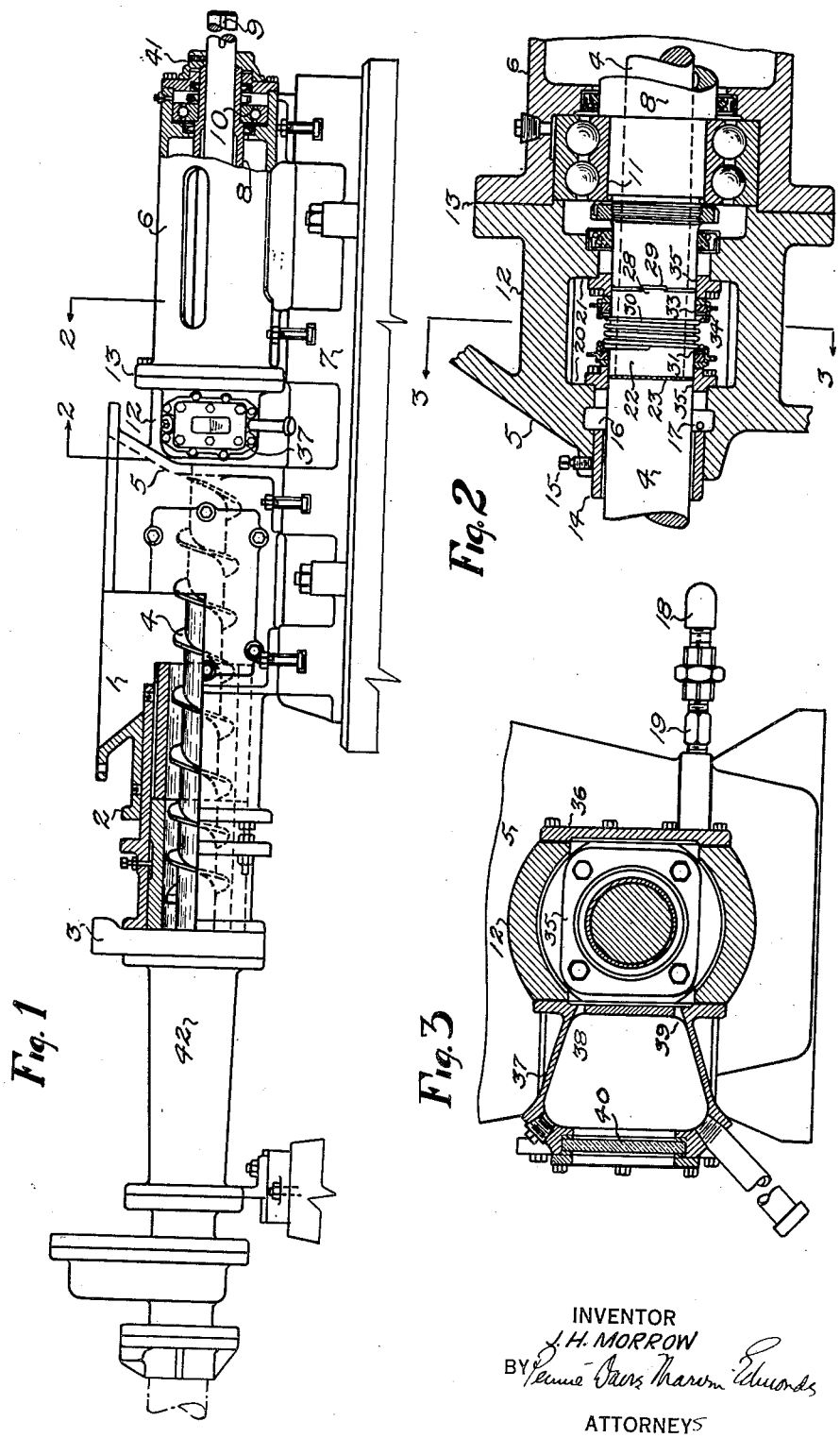

INVENTOR
J. H. MORROW
BY
ATTORNEYS

Patented May 7, 1935

2,000,293

UNITED STATES PATENT OFFICE 2,000,293

SEAL FOR CONVEYING APPARATUS

Joseph H. Morrow, Hokendauqua, Pa., assignor to Fuller Company, Catasauqua, Pa., a corporation of Delaware Application August 15, 1933, Serial No. 685,167

5 Claims. (Cl. 286—9)

This invention relates to the conveying of pulverized and finely divided materials, and more particularly to an apparatus for preventing the escape of dust particles from conveyor casings. It is especially intended to protect the shaft, driving elements, packing, bearings and associated parts from wear and over-heating, and is of especial utility in preventing the wear of such parts in conveyors handling abrasive materials, such as Portland cement and pulverized limestone, and in overcoming an explosion hazard due to the heat of friction in conveyors handling fine combustibles, such as pulverized coal and starch.

The invention is applicable to conveyors, including pulverized material feeders of various types, and has been used advantageously in apparatus of the type disclosed in my Patents Nos. 1,804,565, 1,890,298, 1,941,572, 1,941,573 and 1,971,425. Reference is also made to Kinyon Patent 1,677,119 for a better understanding of the present improvements.

In the apparatus of the prior art, dust particles working outwardly through the shaft openings of the conveyor casings result in natural wear and overheating of the driving elements and their associated parts. In the Kinyon patent above identified, there is disclosed a successful expedient for overcoming this difficulty. In the device of that patent, the forward end of the impeller screw shaft passes through a wall of the material discharge elbow, and is supported for rotation in an enclosed radial and thrust bearing assembly. In order to protect the latter, compressed air is admitted, and so distributed around the shaft between the bearing and the wall of the elbow, that it forms a countercurrent which flows along the shaft and into the elbow. As the air thus supplied is at a pressure greater than that of the material and air mixture in the elbow, it adequately protects the bearings. However, it should be realized that the wholly enclosed bearing housing in this type of apparatus forms a "dead end" and thus little or no difficulty is encountered in maintaining the necessary counter-flow, as there is no tendency for the housing to leak and thereby permit compressed air carrying dust particles to flow in the opposite direction, that is, through the bearings.

The opposite end of the shaft in this apparatus is supported in a pillowblock bearing, separate from the conveyor casing, and passes through a stuffing-box in the rear wall of the latter. This stuffing-box is similarly protected by compressed air counter-flow, and this has been found essential to satisfactory operation, in spite of the fact that the pressure in the hopper tending to carry material backwardly along the shaft would only be slightly above atmospheric. While the pressure in the hopper of simple pulverized material feeders is ordinarily due only to the pressure head of material above the materials handling element, aggravated at times when floods of material occur, this pressure head in the apparatus of the patent may be supplemented, particularly when the feed decreases, by the effect of air pressure working backwardly along the impeller screw. As the stuffing box employed does not form an adequate "dead end", leakage of dust laden air requires frequent repacking and replacement of worn parts.

In the device of my Patent No. 1,804,565, the inner bearing is subjected to pressure conditions almost identical to those encountered in the forward bearing assembly of the Kinyon invention, and accordingly, the counterflow principle of the Kinyon patent has been employed, but since the parts cannot be enclosed to form a dead end, I have included additional parts which cooperate to produce that effect. These parts include fixed and rotating sealing rings, and the latter are sealed by suitable packing and held in contact with the former by a compression spring.

In the device of my application Serial No. 612,616, the inner bearing is subjected to pressure conditions similar to those encountered in the stuffing box of the conveyor of the Kinyon patent, but as the screw shaft is overhung from spaced bearings and the inner bearing should preferably be as close to the wall of the hopper as possible to reduce the tendency for the free end of the shaft to oscillate or "whip", the bearings are arranged in a unitary support rigidly secured to the hopper, and the use of a positive dead end sealing device is, therefore, essential in order to protect the bearings and adjacent parts.

In many classes of service in which these conveyors are employed, it is necessary that they operate continuously over long periods and delays for repair or replacement of parts must be reduced to a minimum. Accordingly, in the development of the conveyors of my patents and applications, I have so constructed the apparatus that removal of the screw shaft can be effected without dismantling the bearing assembly and this can be done in a short time. Such apparatus thus offers distinct advantages over the apparatus of the Kinyon patent in these respects.

In actual service with my apparatus I have found that the sealing rings employed are liable to wear and to require replacement because of carelessness on the part of the operator or failure of the supply of air which is used for countercurrent flow. Also, in some instances, efficiency in the amount of material handled requires that the total quantity of air employed for the countercurrent be reduced to a minimum so that the material density will be greater. This increase in the density in the material considerably increases the effective capacity of the impeller screw since the material then has less tendency to slip and the material seal can be effected with lower mechanical compression. However, the reduction in the quantity of air employed for the countercurrent may permit leakage of dust-laden air which results in the wear referred to.

The present invention is directed to the provision of means for overcoming the difficulties above set forth and the means employed provides a positive dead end sealing device that may be removed and replaced quickly without disturbing the bearing assembly. Only a few other parts in addition to the sealing device must be removed in order to permit removal and replacement of the latter and the new construction thus makes it possible to keep the conveying apparatus in service with a minimum of delays for replacement of worn parts. Also, if operating conditions require excessive capacities which necessitate reduction or complete stoppage of the countercurrent air flow which would in turn result in destruction of the sealing device, such requirements can be fulfilled without excessive delays inasmuch as the sealing device can be quickly replaced.

In the new apparatus, the conveyor shaft passes through a wall of the conveyor casing beyond which it carries a short bushing which turns with it. This bushing carries at least one and preferably duplicate rings, longitudinally movable thereon, and provided with a bearing surface in the plane of rotation and an internal circumferential channel which accommodates a packing ring. The packing ring is subject to the thrust of a coil spring, which surrounds the bushing, thereby sealing the space of clearance between the ring and bushing and forcing the ring to rotate with the latter.

The thrust of the spring forces the bearing surface of the ring to bear against an annular boss on a fixed ring, the latter having a flange secured to the wall of a chamber preferably formed in the body of the conveyor casing, and in which the entire seal assembly is accommodated. The fixed and rotating rings are thus in metal-to-metal contact, except for the lubricating oil, and thus form a positive dead end seal against the entrance of dust-laden air. Preferably, duplicate rings are arranged at each end of the chamber under the compression of the same spring, the front pair serving to exclude dust-laden air and the rear pair to prevent the escape of lubricating oil from the chamber and to increase the effectiveness of the dust seal.

The short bushing is keyed or otherwise secured to a long bushing which surrounds the remainder of the shaft and which serves to support the latter in the bearing assembly. The chamber in which the dust-sealing devices are enclosed is preferably provided with oppositely arranged ports, at least one of which is closed by a sightglass, so that the discoloration of the oil will indicate to the operator that material is entering the chamber and that the sealing rings have become worn and require replacement. To replace the sealing elements, the shaft is released and drawn forwardly through the short bushing, the ports removed, and the fixed ring or rings released from the chamber walls, and then by compressing the spring, the entire assembly, including the bushing, can be withdrawn through one of the ports, and a new one substituted, all as more fully described hereinafter.

In the accompanying drawings, the invention is shown in its application to a stationary pump for pulverized materials in a location equivalent to the stuffing box of the Kinyon patent above mentioned, and in a portable pump, where it is located beyond the wall of the discharge elbow, where the pressure conditions are equivalent to the forward bearing assembly of the Kinyon patent. Reference is made specifically to the drawings, in which Fig. 1 is a side elevation, partly in section, of a stationary pump, for dry pulverized materials;

Fig. 2 is an enlarged detail in sectional elevation between lines 2—2 of Fig. 1;

Fig. 3 is a cross section on line 3—3 of Fig. 2;

Figure 4:
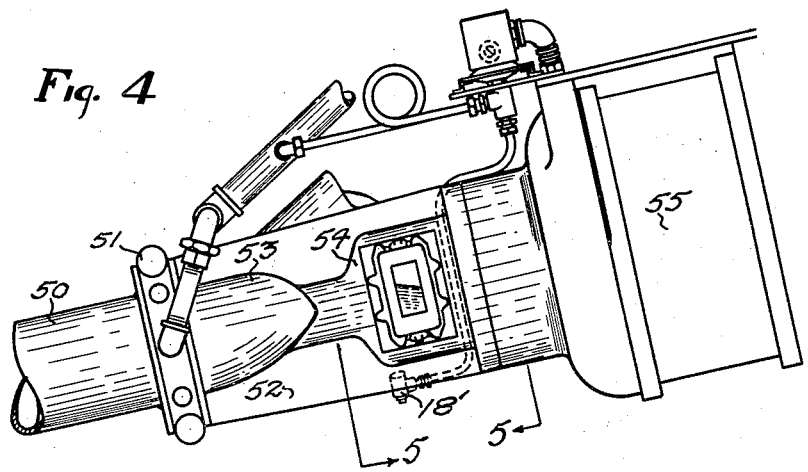
Fig. 4 is a partial elevation of a portable pump for dry pulverized materials.
Figure 5:
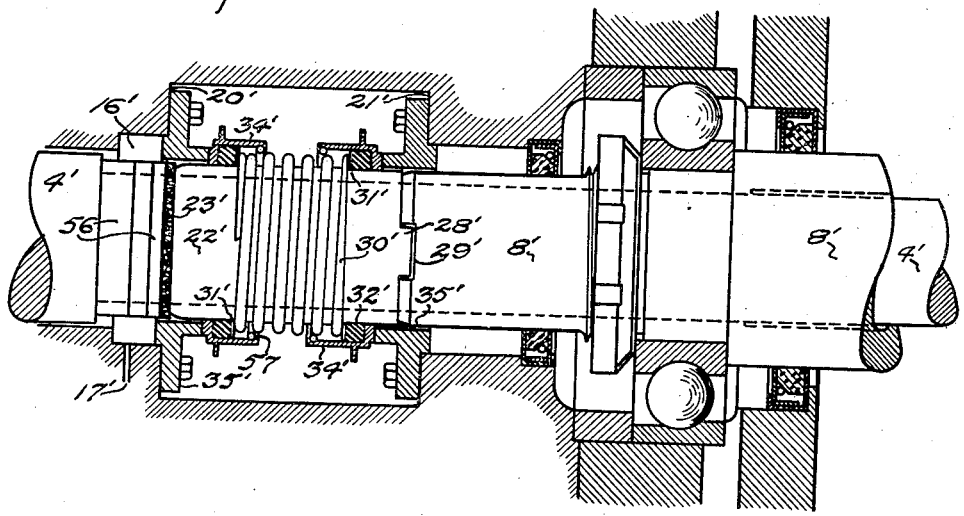
Fig. 5 is an enlarged sectional elevation between lines 5—5 of Fig. 4.

Referring now to the drawings, and first to Fig. 1, the apparatus will be seen to consist of a hopper 1, into which the materials to be conveyed descend by gravity from the usual sources of supply. A barrel section 2 opens into the front wall of the hopper and terminates in the usual air ring 3, through which compressed air for aerating the material is admitted in a manner well-understood in the art. The material is advanced through the hopper and barrel 2 by means of the impeller screw 4. The screw shaft passes through the rear wall 5 of the hopper and is supported for rotation in a unitary bearing support 6, which with the hopper, is mounted on a common base 7.

The shaft bearing assembly includes a relatively long bushing 8, through which the shaft extends and which is provided with a keyway 9, whereby it may be coupled to any suitable prime mover (not shown). The bushing turns with the shaft and is carried in a radial bearing 10, near one end of the support 6, and a combined radial and thrust bearing 11 near the wall of the hopper.

In order to maintain proper alignment of the screw 4 within the hopper 1 and the barrel 2, the hopper is preferably formed with an extension 12, beyond its rear wall 5, which is suitably flanged and secured as at 13 to the bearing support 6. The shaft opening, provided in the hopper wall 5, is protected against erosion by a renewable sleeve 14, secured by a set screw 15, the sleeve clearing the shaft 4 about $\frac{1}{32}$ of an inch, to form a passage for a countercurrent of compressed air, which is distributed and flows forwardly and along the shaft into the hopper 1, to prevent the rearward movement of dust particles. The sleeve 14 extends rearwardly to a small annular air distributing chamber 16, to which air is supplied through the port 17, and suitable piping 18, and under the control of a choke plug 19, as indicated in Fig. 3.

Beyond the chamber 16 a large chamber, having a front wall 20 and a rear wall 21, is provided to accommodate the dead end sealing devices. Slightly to the rear of the wall 20, the screw shaft 4 is reduced in diameter to form a shoulder to abut a short bushing 22, the parts being sealed by a compressible gasket 23, which prevents air from the chamber 16 from entering the space between the inner surface of the bushing and the reduced section of the shaft 4. The bushing 22 is provided with a key 28, complementary to the key-seat 29, provided in the forward end of the bushing 8, so that the bushing will rotate with the shaft. Surrounding the center of the bushing 22 is compression spring 30, the opposite ends of which bear against washers 31, which retain packing rings 33, preferably of rubber of the type resistant to oil, arranged in a circumferential channel in each of the rotating rings 34. Each of these rings has a smooth bearing surface in the plane of rotation, which bears against an annular boss on fixed rings 35, each of the latter having a flange, suitably secured as by means of cap screws to the end walls of the chamber. It will be seen that the sealing ring assemblies are symmetrically arranged on opposite sides of the spring, the forward members serving to prevent the entrance of dust into the chamber, and the rear members preventing the escape of lubricating oil, which is preferably maintained at shaft level.

By reference to Fig. 3, it will be seen that the chamber is provided with ports on opposite sides of the shaft 4, closed on one side by a plate 36 and at the other by an oil reservoir 37. The reservoir communicates with the chamber through openings 38 and 39, and its outside wall is provided with a sight glass 40 so that the operator can determine by the appearance of the oil whether or not the forward, fixed or rotating sealing rings are so worn that material is entering the chamber.

In order to remove and renew the sealing devices, the dust seal 41 at the end of the shaft 4 is released, together with the motor coupling (not shown), the pipe line connections 42 are removed, and the screw shaft 4 drawn forwardly through both the bushings 8 and 22. It is noted that as the thrust is rearward, the bushings need not be secured positively to the shaft. The operator then removes the plate 36 and the oil reservoir 37, and then by removing the cap screws which secure the flanges of the rings 35 and compressing the spring 30, the bushing 22, together with the fixed and rotating rings can be removed bodily and replaced in a similar manner.

Referring to Fig. 4, it is seen that in the portable pump the barrel 50 is suitably flanged to an air ring 51, likewise secured to a discharge section 52, which includes an offset discharge elbow 53. Section 52 is provided with an enlarged portion 54 to accommodate the dust sealing device to be described more particularly hereinafter. The discharge section is directly secured to the end-bell of the driving motor, indicated generally at 55.

The dust sealing arrangement for the screw shaft, bearings and associated parts is substantially similar to that described above. The screw shaft 4' is shouldered adjacent to the air distribution chamber 16', to which compressed air is admitted through the port 17' and the piping indicated generally at 18' in Fig. 4. Surrounding the shaft 4' are a plurality of spacing washers 56, which permit longitudinal adjustment of the shaft for the purpose of modifying the material seal. Beyond these spacing washers, the gasket 23' of felt or other compressible material, is inserted to prevent air from the chamber 16' from entering the space between the shaft and the short bushing 22'. The bushing 22' is accommodated within a chamber having a front wall 20' and a rear wall 21' in the enlarged portion 54 of the discharge section, and is secured for rotation by means of the key 28' accommodated in the key seat 29' formed in the shaft bushing 8'. The compression spring 30' bears against the washers 31', which retain the packing rings 32'.

The packing rings 32' are arranged within the channels formed in each of the rotating rings 34', and in which the terminal coils of the spring are preferably secured as by means of lock wires 57. The rings 34' are each provided with a bearing surface in the plane of rotation, which bears against an annular boss on the fixed rings 35'.

It will be seen from the above that the bearing surfaces of the forward, fixed and rotating rings form, due to the compression of the spring, an effective dead end to resist the pressure of the air forming the counterflow, as well as the pressure of the material and air mixture which will be present when the counterflow is limited or absent. When one or both of these rings become worn, and the dead end effect partially lost, the material entering the chamber will be suspended in the lubricating oil, and will be prevented from entering the bearings and other parts beyond the chamber by the seal formed between the rear, fixed and rotating rings.

It should be noted that although these sealing rings will last indefinitely if the apparatus is properly operated, unskilled labor is usually employed to operate cement pumps on construction projects, for example, and accordingly it is essential that the sealing apparatus be arranged for quick replacement, as well as to indicate to the operator that the parts are defective.

I claim:

1. In an apparatus for conveying pulverized material which includes a casing having a wall provided with an opening and a shaft in the casing extending through the opening and supported for rotation in bearings outside said casing, means for preventing passage of said material through said opening which comprises a chamber surrounding the shaft between the opening and the bearings, a bushing surrounding and rotating with the shaft and lying wholly within said chamber, a fixed bearing surface on a wall of the chamber around said opening, a ring mounted removably on said bushing and having a bearing surface in the plane of rotation of said shaft and engaging said fixed surface, said ring also having a circumferential channel, compressible packing material lying within said channel in contact with the surface of said bushing, spring means surrounding said bushing and forcing said packing against said bushing and forcing said bearing surfaces into contact, and a port in said chamber through which said bushing, spring means, ring, and packing material can be removed.

2. In an apparatus for conveying pulverized material which includes a casing having a wall provided with a shaft opening, a shaft in the casing extending through said opening, bearings outside the casing supporting the shaft for rotation, and a main bushing surrounding a portion of the shaft and interposed between it and the bearings, means for preventing passage of material through said opening and into said bearings, which comprises a chamber surrounding the shaft between the opening and the bearings, a short bushing lying wholly within said chamber and surrounding and rotating with said shaft, said short bushing being secured to said main bushing, a fixed bearing surface on a wall of the chamber around said opening, a ring mounted removably on said short bushing and having a bearing surface in the plane of rotation of said shaft and contacting with said fixed surface, said ring having a circumferential channel, compressible packing material lying within said channel and in contact with the surface of said short bushing, spring means acting to force said packing against said bushing and to force said bearing surfaces together, and a port in said chamber through which said short bushing, spring means, ring, and packing material can be removed.

3. In an apparatus for conveying pulverized material which includes a casing having a wall provided with a shaft opening, a shaft in the casing extending through said opening, bearings outside the casing supporting the shaft for rotation, and a main bushing surrounding a portion of the shaft and interposed between it and the bearings, means for preventing passage of material through said opening and into said bearings, which comprises a chamber surrounding the shaft between the opening and the bearings, a short bushing lying wholly within said chamber and surrounding and rotating with said shaft, said short bushing being secured to said main bushing, a fixed ring mounted within said chamber around said opening, said fixed ring having a bearing surface, a ring removably mounted on said short bushing and having a bearing surface in the plane of rotation of said shaft and contacting with the bearing surface on said fixed ring, said removable ring having a circumferential channel, compressible packing material lying within the channel and in contact with the surface of said short bushing, spring means surrounding said short bushing and acting to force said packing against the surface of said short bushing and to force said bearing surfaces together, and a port in said chamber through which said short bushing, spring means, removable ring, and packing material can be removed.

4. In an apparatus for conveying pulverized material which includes a casing having a wall provided with a shaft opening, a shaft in the casing extending through said opening, bearings outside the casing supporting the shaft for rotation, and a main bushing surrounding a portion of the shaft and interposed between it and the bearings, means for preventing passage of material through said opening and into said bearings, which comprises a chamber surrounding said shaft between said opening and the bearings, said shaft extending through the chamber, a short bushing surrounding and rotating with said shaft and lying wholly within said chamber, a pair of fixed rings secured to the wall of the chamber at opposite ends thereof, said rings surrounding said shaft and each ring having a bearing surface in the plane of rotation of said shaft, a pair of rings removably mounted on said short bushing and each having a bearing surface engaging a bearing surface of one of said fixed rings, each of said removable rings having a circumferential channel, compressible packing material in each of said channels and contacting with the surface of said short bushing, spring means surrounding said short bushing and acting to force said packing against said short bushing and to force the bearing surfaces of said fixed and removable rings into engagement, and a port in the wall of said chamber through which said short bushing, spring means, rings, and packing material can be removed.

5. In an apparatus for conveying pulverized material which includes a casing having a wall provided with a shaft opening, a shaft in the casing extending through said opening, bearings outside the casing supporting the shaft for rotation, and a main bushing surrounding a portion of the shaft and interposed between it and the bearings, means for preventing passage of material through said opening and into said bearings, which comprises a chamber surrounding the shaft between the opening and the bearings, a short bushing lying wholly within said chamber and surrounding and rotating with said shaft, said short bushing being secured to said main bushing, a fixed bearing surface on a wall of the chamber around said opening, a ring mounted removably on said short bushing and having a bearing surface in the plane of rotation of said shaft and contacting with said fixed surface, said ring having a circumferential channel, compressible packing material lying within said channel and in contact with the surface of said short bushing, spring means acting to force said packing against said bushing and to force said bearing surfaces together, means for admitting compressed air to said shaft opening between the wall of the casing and said chamber, and a port in said chamber through which said short bushing, spring means, ring, and packing material can be removed.

JOSEPH H. MORROW.